US005757292A

United States Patent [19]

Amro et al.

[11] Patent Number: 5,757,292
[45] Date of Patent: May 26, 1998

[54] KEYBOARD CAP EXTENSION APPARATUS

[75] Inventors: Hatim Yousef Amro, Austin; Dan Le Dao, Cedar Park; John Paul Dodson, Pflugerville, all of Tex.

[73] Assignee: International Business Machines Corporation, Armonk, N.Y.

[21] Appl. No.: 748,439

[22] Filed: Nov. 13, 1996

[51] Int. Cl.$^6$ ............................................. H03M 11/00
[52] U.S. Cl. ........................... 341/22; 341/20; 341/23; 40/330; 400/488; 400/490; 400/495; 200/308
[58] Field of Search .................................. 341/22, 20, 23; 400/488, 490, 495; 40/330, 331; 200/308

[56] References Cited

U.S. PATENT DOCUMENTS

| 3,648,394 | 3/1972 | Hepner | 40/331 |
|---|---|---|---|
| 5,034,574 | 7/1991 | Martovitz | 200/6 A |
| 5,207,426 | 5/1993 | Inoue et al. | 273/148 B |
| 5,391,006 | 2/1995 | Danziger | 400/488 |
| 5,396,030 | 3/1995 | Matsumiya et al. | 200/6 A |
| 5,496,977 | 3/1996 | Date et al. | 200/6 A |
| 5,498,843 | 3/1996 | Date et al. | 200/6 A |

*Primary Examiner*—Michael Horabik
*Assistant Examiner*—Albert K. Wong
*Attorney, Agent, or Firm*—Richard A. Henkler; Kermit D. Lopez; Andrew J. Dillon

[57] ABSTRACT

A removable keyboard cap extension apparatus for a data processing system entry keyboard having a number of data entry keys which are constructed to electronically convey data. The removable keyboard cap extension apparatus includes a keyboard cap adapted to fit onto a key among a plurality of keys for use by a user of a particular data processing application among a number of data processing applications. The removable keyboard cap extension apparatus has a body that includes an upper planar surface, wherein the body and its upper planar surface are elevated above the data entry keys such that the upper planar surface is enhanced larger than the data entry key. The removable keyboard cap extension apparatus can be connected to an individual data entry key, or can replace the data entry key. A depression at any point on the upper planar surface will actuate only the individual data entry key which the removable keyboard cap extension apparatus is connected or replaces. In addition, the removable keyboard cap extension apparatus is not limited to a specific type or size of data entry key or data processing entry keyboard.

9 Claims, 5 Drawing Sheets

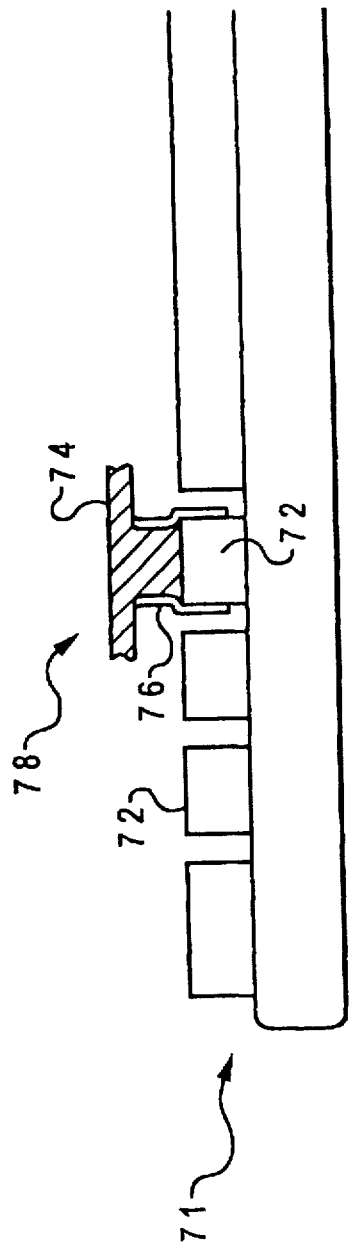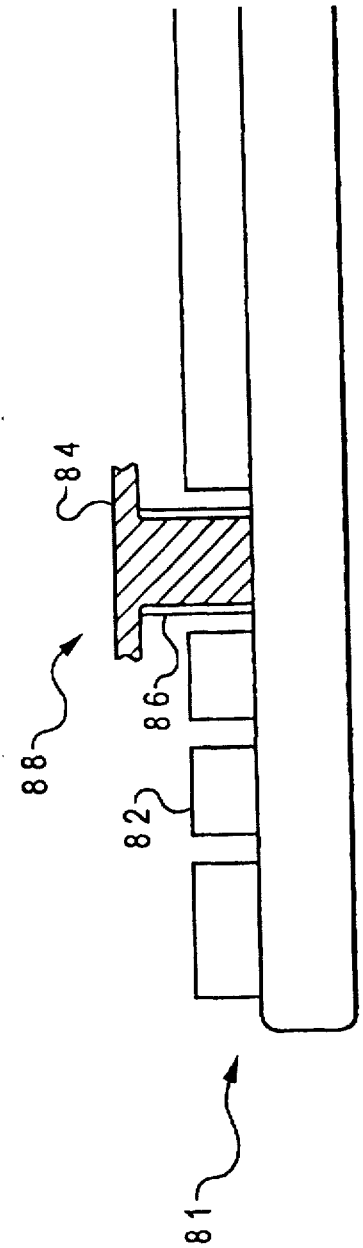

KEYBOARD CAP EXTENSION APPARATUS

BACKGROUND OF THE INVENTION

1. Technical Field

The invention relates in general to data processing systems and in particular to data processing entry systems such as computer keyboards. Still more particularly the invention relates to keyboards used in data processing applications requiring the use of only a subset of the keys on the keyboard.

2. Description of the Related Art

A keyboard is that part of a computer system that resembles a typewriter keyboard and enables a user to control certain aspects of the computer. Because information flows in one direction, from the keyboard to the computer, the keyboard is considered an input-only device. Functionally, it represents half of a complete input/output device, the output half being the computer display such as a video screen monitor or liquid crystal display device.

All computer keyboards include a standard set of printable characters, usually based on the QWERTY pattern typical of most typewriters, and many also have a calculator-like numeric keypad at one side. All keyboards also include a number of non-text keys and function keys. On such a keyboard, the combination of a plastic keycap (which typically has a character printed on its face), a tension mechanism that suspends the keycap but allows it to be pressed down, and an electronic mechanism that records the key press and key release make up an individual key.

Using a keyboard as an input device for some applications that only need a small subset of the keys can be an awkward task, which is typically tedious, and depending upon a given software application which utilizes the keyboard as an input device, almost infeasible. For instance, some software applications utilized in computer data processing systems utilize a keyboard to manipulate or control certain functions. For example, certain software game applications utilize the keyboard to control game functions. Functions such as "fire control," "weapons selection," "mode selection," "speed" and so forth are typically mapped to specific keys on the keyboard, such as "A", "L", "+", "ctrl" and so on. Because of the dense arrangement of the keys on the keyboard, rapid and accurate key selection is both awkward and tedious. For some applications that require quick responses, it may be nearly impossible. A need thus exists for a keyboard cap extension apparatus which allows a data processing keyboard user to avoid the tedium, awkwardness, and difficulty associated with standard data processing or computer keyboards, but which can be efficiently and effectively utilized with any standard data processing or computer keyboard.

SUMMARY OF THE INVENTION

It is therefore an object of the invention to provide for a data processing input device which can be utilized in a data processing system.

It is another object of the invention to provide for a data processing keyboard having data entry keys with keycaps.

It is still another object of the invention to provide for a keycap extension for data entry keys.

The foregoing objects are achieved as is now described. A removable keyboard cap extension apparatus for a data processing system entry keyboard having a number of data entry keys which are constructed to electronically convey data. The removable keyboard cap extension apparatus includes a keyboard cap adapted to fit onto a key among a plurality of keys for use by a user of a particular data processing application among a number of data processing applications. The removable keyboard cap extension apparatus has a body that includes an upper planar surface, wherein the body and its upper planar surface are elevated above the data entry keys such that the upper planar surface is enhanced larger than the data entry key. The removable keyboard cap extension apparatus can be connected to an individual data entry key, or can replace the data entry key. A depression at any point on the upper planar surface will actuate only the individual data entry key which the removable keyboard cap extension appatatus is connected or replaces. In addition, the removable keyboard cap extension apparatus is not limited to a specific type or size of data entry key or data processing entry keyboard.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

FIG. 4 is a sectional view of a portion of a computer keyboard showing a keyboard cap extension apparatus and data entry keys which can be utilized in accordance with the apparatus of the present invention.

FIG. 6 is a sectional view of a portion of a computer keyboard replaces showing data entry keys and a keyboard cap extension apparatus that replaces a data entry key and which can be utilized in accordance with the apparatus of the present invention.

DETAILED DESCRIPTION OF PREFERRED EMBODIMENT

Figure 1:
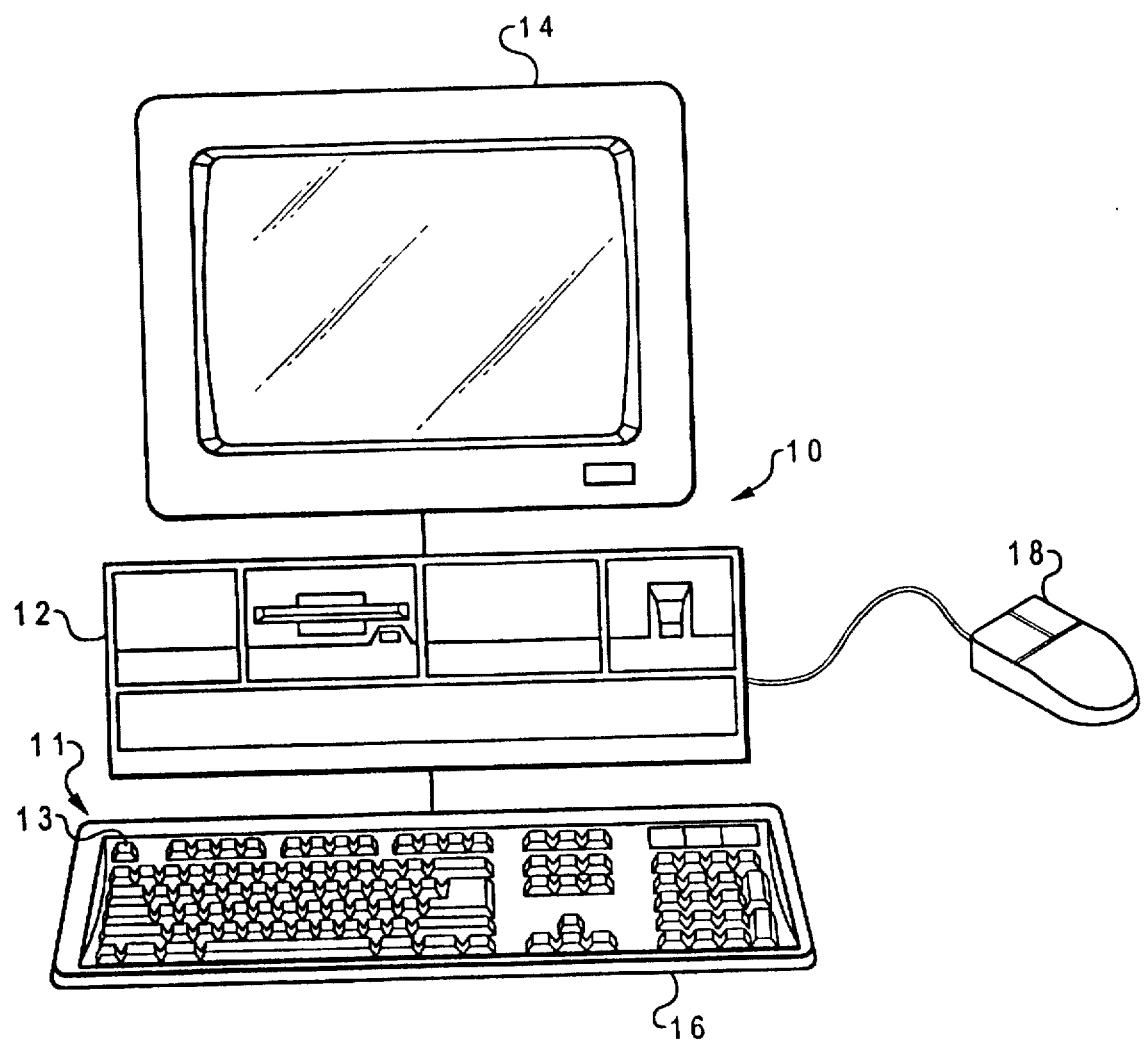
FIG. 1 is pictorial representation of a data processing system that can be utilized in accordance with the apparatus of the present invention.

With reference now to the figures and in particular with reference to FIG. 1, there is depicted a pictorial representation of a data processing system in which the present invention may be implemented in accordance with a preferred embodiment of the present invention. A personal computer 10 is depicted which includes a system unit 12, a video display terminal 14, a keyboard 16, and a mouse 18. Keyboard 16 contains a variety of data entry keys 11. A specific example of an individual data entry key is depicted at data entry key 13. Keyboard 16 provides a number of keycaps for a standard QWERTY keyboard. The keycaps (i.e. also referred to as "keyboard caps") identify the data entry keys on the keyboard 16. In practice, the keycaps normally are referred to as "keys". However the keycap itself is mounted on a switch that actually facilitates the key press and key release. A keycap, in combination with such a switch, comprises an individual data entry key. The switch can include a tension mechanism (not shown in FIG. 1) that suspends the keycap but allows it to be pressed down.

Personal computer 10 may be implemented utilizing any suitable computer such as an IBM Aptiva™ computer, a product of International Business Machines Corporation, located in Armonk, N.Y. "Aptiva" is a registered trademark of International Business Machines Corporation. Although the depicted embodiment involves a personal computer, a preferred embodiment of the present invention may be implemented in other types of data processing systems, such as, for example, intelligent workstations or mini-computers. Computer 10 may be implemented utilizing any suitable computer such as the IBM Aptiva™ computer or an IBM RISC SYSTEM/6000 computer, both products of International Business Machines Corporation. "RISC SYSTEM/6000" is a trademark of International Business Machines Corporation and Aptiva™ is a registered trademark of International Business Machines Corporation.

Figure 2:
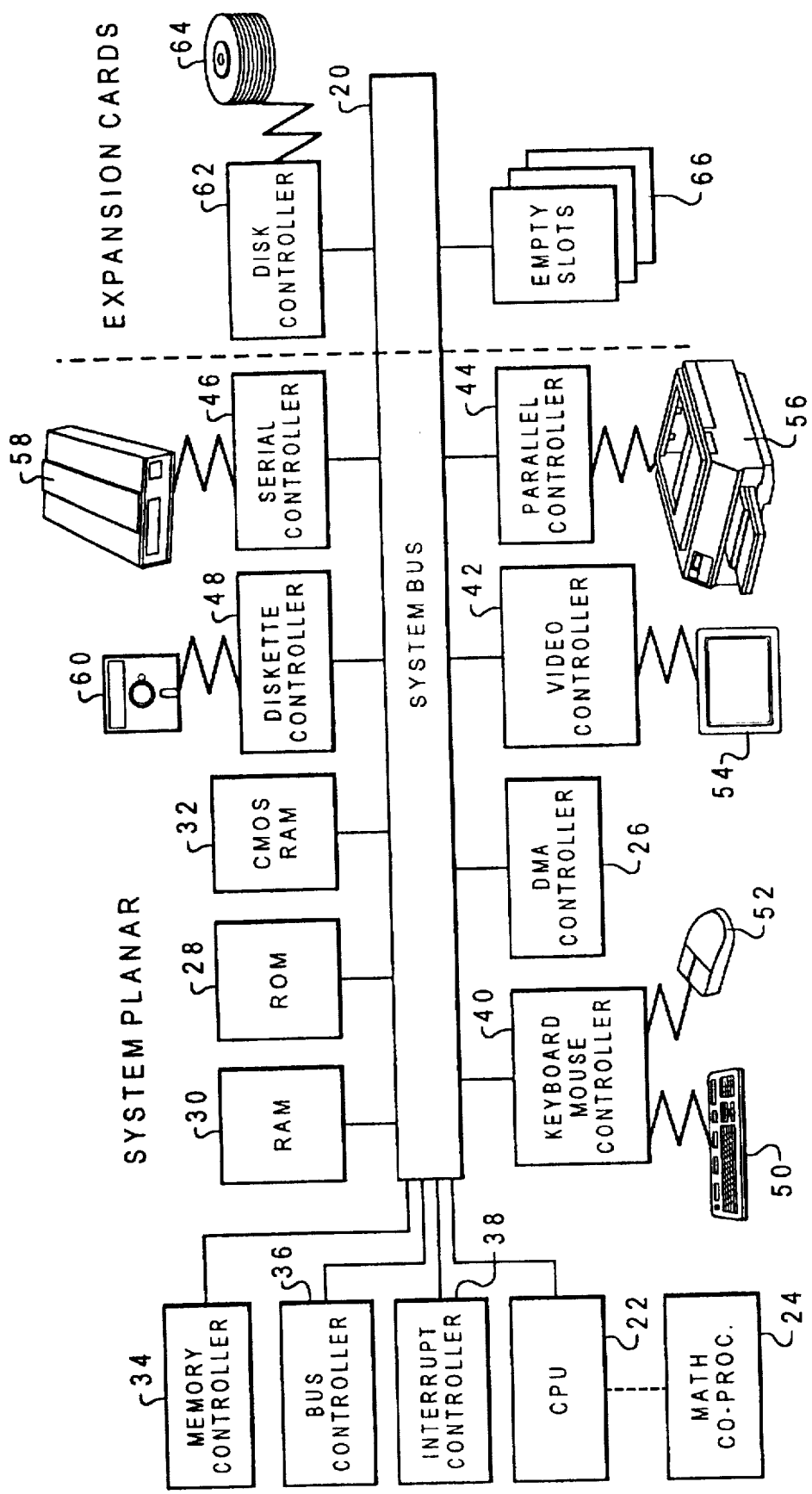
FIG. 2 depicts a block diagram of selected components in the data processing system illustrated in FIG. 1 which can be utilized in accordance with the apparatus of the present invention.

FIG. 2 depicts a block diagram of selected components in the data processing system illustrated in FIG. 1 which can be utilized in accordance with the apparatus of the present invention. System unit 12 of FIG. 1 preferably includes a system bus 20, as depicted in FIG. 2. System bus 20 is utilized for interconnecting and establishing communication between various components in system unit 12. Microprocessor 22 is connected to system bus 20 and also may have numeric coprocessor 24 connected to it. Direct memory access ("DMA") controller 26 is also connected to system bus 20 and allows various devices to appropriate cycles from microprocessor 22 during large I/O transfers.

Read only memory ("ROM") 28 and Random Access Memory (RAM) 30 are also connected to system bus 20. ROM 28 contains the power-on self test ("POST") and the Basic Input/Output System ("BIOS") which control hardware operations. The POST is a set of routines stored in ROM that tests various system components such as RAM, the disk drives, and the keyboard to determine if such devices are properly connected and operating. If problems are discovered, the POST routines alert the user by displaying a message, often accompanied by a diagnostic numeric value, to the standard output or standard error device (i.e., the screen). The BIOS is a set of routines that work closely with the hardware to support the transfer of information between elements of the system, such as memory, disks, and the monitor. On IBM and compatible computers, the BIOS is typically built into the ROM. ROM 28 is mapped into the microprocessor 22 address space in the range from 640K to 1 megabyte. CMOS RAM 32 is attached to system bus 20 and contains system configuration information.

Also connected to system bus 20 are memory controller 34, bus controller 36, and interrupt controller 38 which serve to aid in the control of data flow through system bus 20 between various peripherals, adapters, and devices. System unit 12 of FIG. 1 also contains various input/output (I/O) controllers such as those depicted in FIG. 2: keyboard and mouse controller 40, video controller, 42, parallel controller 44, serial controller 46, and diskette controller 48. Keyboard and mouse controller 40 provide a hardware interface for keyboard 50 and mouse 52. Video controller 42 provides a hardware interface for video display terminal 54. Parallel controller 44 provides a hardware interface for devices such as printer 56.

Serial controller 46 provides a hardware interface for devices such as a modem 58. Diskette controller 48 provides a hardware interface for floppy disk unit 60. Expansion cards also may be added to system bus 20, such as disk controller 62, which provides a hardware interface for hard disk unit 64. Empty slots 66 are provided so that other peripherals, adapters, and devices may be added to system unit 12 of FIG. 1. Those skilled in the art will appreciate that the hardware depicted in FIG. 2 may vary for specific applications. For example, other peripheral devices such as optical disk media, audio adapters, or chip programming devices such as a PAL or EPROM programming devices, and the like also may be utilized in addition to or in place of the hardware already depicted.

Figure 3:
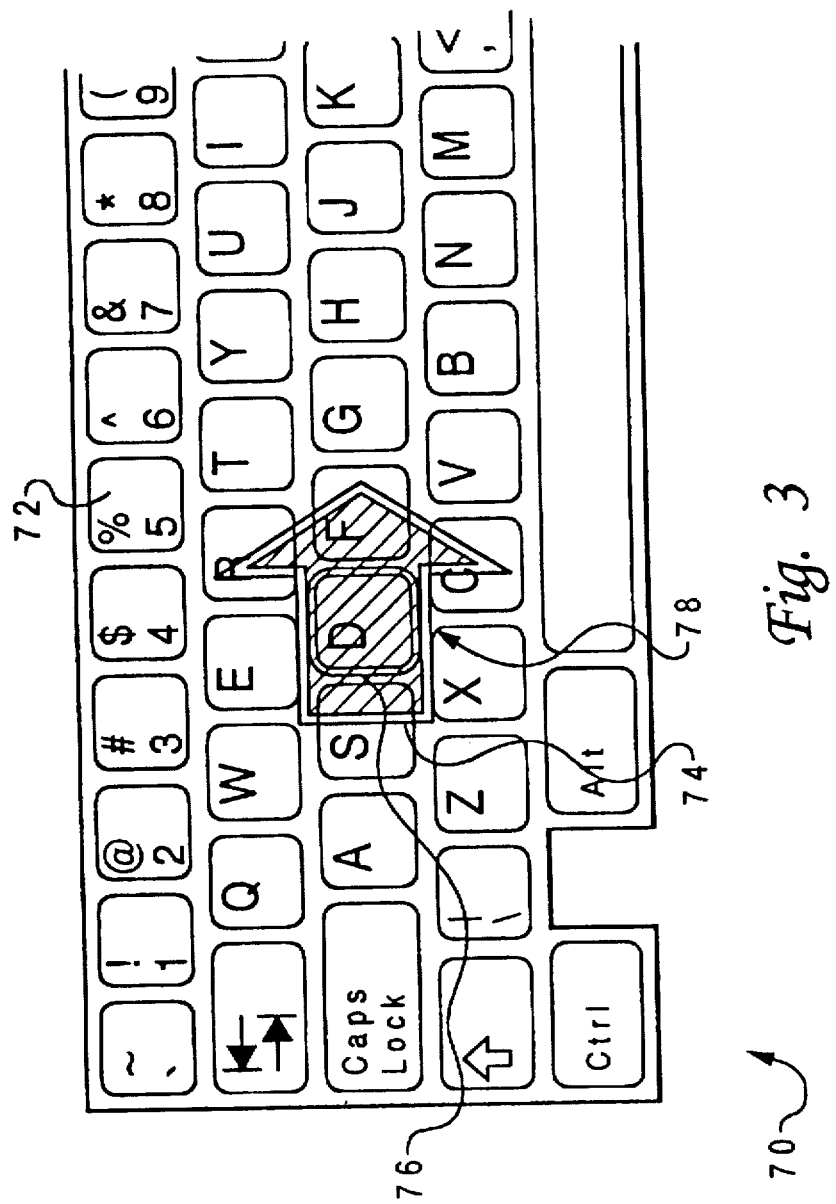
FIG. 3 is a plan view of a portion of a computer keyboard showing a keyboard cap extension apparatus and data entry keys which can be utilized in accordance with the apparatus of the present invention.
Figure 5:
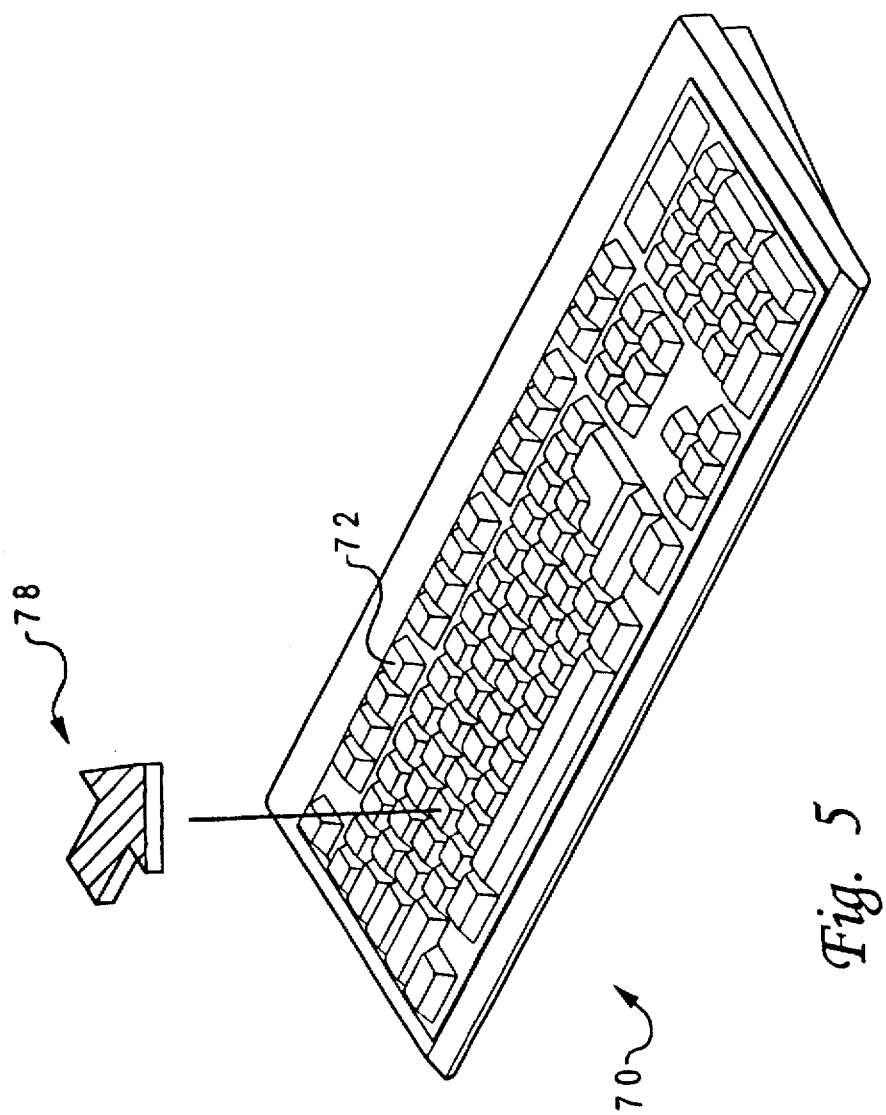
FIG. 5 is a side view of a computer keyboard and a keyboard cap extension apparatus and data entry keys which can be utilized in accordance with the apparatus of the present invention.

FIG. 3 is a plan view of a portion of a computer keyboard 70 showing a keyboard cap extension apparatus 78 and data entry keys 72 which can be utilized in accordance with the apparatus of the present invention. FIG. 4 is a sectional view of a portion of a computer keyboard 70 showing a keyboard cap extension apparatus 78 and data entry keys 72 which can be utilized in accordance with the apparatus of the present invention. FIG. 5 is a side view of a computer keyboard 70 and a keyboard cap extension apparatus 78 and data entry keys 72 which can be utilized in accordance with the apparatus of the present invention.

Referring now to the drawings of FIG. 3, FIG. 4, and FIG. 5 in which like parts are designated by like reference characters, a computer keyboard 70 includes data entry keys 72 formed in a rectangular array. Keyboard 70 is analogous to keyboard 16 of FIG. 1 and keyboard 40 of FIG. 2. Keyboard cap extension apparatus 78 is provided with a central arm 76 and a body 74. A single data entry key 72 is connected to keyboard cap extension apparatus 78 such that body 74 is elevated above each data entry key 72. Keyboard cap extension apparatus 78 is raised above keyboard 70 and is wider than a single data entry key 72. Thus, when a user taps or hits keyboard cap extension apparatus 78, only the single data entry key positioned below and connected to keyboard cap extension apparatus 78 will be activated.

Keyboard cap extension apparatus 78 can be composed of plastic and is shaped and sized to the needs of a given data processing application for a data processing system such as system unit 12 of FIG. 1. For example, keyboard cap extension apparatus 78 can be formed in the shape of an arrowhead to act as a direction selector. In such an example, keyboard cap extension apparatus 74 has a surface with a shape (i.e., body 78) indicative of its purpose. Keyboard cap extension apparatus 78 can also be provided in any quantity that a user desires so long as a single keyboard cap extension apparatus fits onto a keyboard and is mapped to a specific key by, for example, a software application. Keyboard cap extension apparatus 78 can be connected to a data entry key 72 by snap fitting keyboard cap extension apparatus 78 onto data entry key 72. The "snap on" keyboard cap extension apparatus 78 can either snap fit to a data entry key 72 or, after removal of the keycap, snap fitted to the switch or tension mechanism (not shown in FIG. 3, FIG. 4, and FIG. 5) upon which data entry key 72 was originally mounted, in effect, replacing data entry key 72.

Data entry key 72 is specifically connected to keyboard cap extension apparatus at central arm 76. Keyboard cap extension apparatus 78 can be preconfigured for a specific software application, or dynamically configured as determined by the user for a given data processing system application which utilizes the keyboard as a data processing input device. Keyboard cap extension apparatus 78 can also be utilized for any combination of keys on a keyboard and is not limited to a specific type or size of key on the keyboard. Those skilled in the art can appreciate from the views provided in FIG. 3, FIG. 4, and FIG. 5 that body 74 has an upper planar surface shaped like an arrow. This upper planar surface extends partially beyond at least one adjoining key. In FIG. 3, for example, a letter D data entry key lies directly below the upper planar surface. The letter D data entry key is surrounded by other data entry keys, including an S data entry key, an X data entry key, a C data entry key, an F data entry key, an R data entry key, and E data entry key. If a user depresses any point on the upper planar surface, the only key which will be actuated in response to a depression of the upper planar surface is the D key, not the adjoining keys (i.e., S data entry key, X data entry key, and so forth). Thus, the views provided in FIG. 3, FIG. 4 and FIG. 5 indicate that keyboard cap extension apparatus 78 includes an upper planar surface and that both body 74 and its associated upper planar surface extend partially over several adjoining keys, but are raised above the surrounding keys and keyboard.

FIG. 6 is a sectional view of a portion of a computer keyboard 81 having multiple data entry keys 82 and a keyboard cap extension apparatus 88 that replaces a data entry key and which can be utilized in accordance with the apparatus of the present invention. Keyboard 81 is a standard QWERTY pattern keyboard, although one skilled in the art of computer and data entry keyboard technology will appreciate that keyboards can be utilized, including keyboards designed for languages other than English. Keyboard cap extension apparatus 88 replaces a single data entry key 82. In the example of FIG. 6, the key has been removed from the keyboard, and the keyboard cap extension apparatus 88 actually is connected directly to keyboard 81 in the same manner as data entry keys 82. Also, keyboard cap extension apparatus 88 is raised above keyboard 81 and is wider than a single data entry key 82.

Keyboard cap extension apparatus 88 is provided with a central arm 86 and a body 84 such that body 84 is elevated above each key data entry key 82. Those skilled in the art will appreciate from the view provided in FIG. 6 that body 84 has an upper planar surface. This upper planar surface and body 84 extend partially beyond at least one adjoining key. Because body 84 is raised above the surrounding keys, those skilled in the art can appreciate that the upper planar surface is also raised above the surrounding keys. A depression at any point on the upper planar surface will only actuate the particular key to which keyboard cap extension apparatus is connected. The data entry key which was previously positioned below keyboard cap extension apparatus 88 is gone, replaced by keyboard cap apparatus 88. Keyboard cap extension apparatus 88 can be composed of plastic and is shaped and sized to the needs of a given data processing application for a data processing system such as system unit 12 of FIG. 1. In the example of FIG. 6, the combination of a plastic data entry keycap which typically has a character printed on its face, a tension mechanism (not shown in FIG. 6) that suspends the keycap but allows it to be pressed down, and an electronic mechanism that records the key press and key release make up an individual entry key 82. In FIG. 6, keyboard cap extension apparatus 88 is connected to keyboard 81 by such a tension mechanism (not shown). Such tension mechanisms are commercially available in the electronic data processing keyboard industry.

While the invention has been particularly shown described with reference to a preferred embodiment, it will be understood by those skilled in the art that various changes in form and detail may be made therein without departing from the spirit and scope of the invention. For example, various combinations and operations of the keys can be achieved to control the display, and various shaped arms, handles, bodies and key caps can be made for fitting over an individual key among a large number of closely packed keys on a keyboard without however departing from the spirit and scope of the invention.

What is claimed is:

1. A removable keyboard cap extension apparatus for a data processing system entry keyboard having a plurality of keys wherein said plurality of keys are constructed to electronically convey data, comprising:

at least one removable keyboard cap adapted to fit onto a particular key among a plurality of keys for use by a user of a particular data processing application among a number of data processing applications, wherein said at least one removable keyboard cap includes an upper planar surface which extends partially over at least one adjoining key and which is elevated above said plurality of keys; and attachment means for attaching said at least one removable keyboard cap to said particular key among said plurality of keys, such that a depression of said upper planar surface at any point on said upper planar surface results in an actuation of only said particular key.

2. The removable keyboard cap extension apparatus of claim 1 wherein said attachment means for attaching said at least one removable keyboard cap to said particular key among said plurality of keys further comprises a snap-on means for attaching said at least one removable keyboard cap to said particular key among said plurality of keys.

3. The removable keyboard cap extension apparatus of claim 1 wherein said attachment means for attaching said at least one removable keyboard cap to said particular key among said plurality of keys further comprises means for connecting said removable keyboard cap to a tension mechanism which connects said particular key among said plurality of keys to said keyboard.

4. The removable keyboard cap extension apparatus of claim 2 wherein said snap-on means for attaching said at least one removable keyboard cap to said particular key among said plurality of keys further comprises means for replacing said particular key among said plurality of keys with said removable keyboard cap.

5. A removable keyboard cap extension apparatus for a data processing system entry keyboard having a plurality of keys wherein said plurality of keys are constructed to electronically convey data, comprising:

at least one removable keyboard cap adapted to fit onto a particular key among a plurality of keys for use by a user of a particular data processing application among a number of data processing applications, wherein said at least one removable keyboard cap has a shape indicative of its purpose and includes an upper planar surface which extends partially over at least one adjoining key and which is elevated above said plurality of keys; and attachment means for attaching said at least one removable keyboard cap to said particular key among said plurality of keys, such that a depression of said upper planar surface at any point on said upper planar surface results in an actuation of only said particular key.

6. The removable keyboard cap extension apparatus of claim 5 wherein said attachment means for attaching said at least one removable keyboard cap to said particular key among said plurality of keys further comprises a snap-on means for attaching said at least one removable keyboard cap to said particular key among said plurality of keys.

7. The removable keyboard cap extension apparatus of claim 5 wherein said attachment means for attaching said at least one removable keyboard cap to said particular key among said plurality of keys further comprises means for connecting said removable keyboard cap to a tension mechanism which connects said particular key among said plurality of keys to said keyboard.

8. The removable keyboard cap extension apparatus of claim 7 wherein said snap-on means for attaching said at least one removable keyboard cap to said particular key among said plurality of keys further comprises means for replacing said particular key among said plurality of keys with said removable keyboard cap.

9. The removable keyboard cap extension apparatus of claim 5 wherein said keyboard cap apparatus comprises the shape of an arrowhead.

* * * * *